US011862900B2

(12) United States Patent
Bou et al.

(10) Patent No.: US 11,862,900 B2
(45) Date of Patent: Jan. 2, 2024

(54) LOW PARTIAL DISCHARGE HIGH VOLTAGE CONNECTOR AND METHODS

(71) Applicant: Teledyne Defense Electronics, LLC, Rancho Cordova, CA (US)

(72) Inventors: Samnang Bou, Lakewood, CA (US); Hamahito Hokyo, Los Angeles, CA (US); Rafael A. Montalvo, Los Angeles, CA (US); Jeffrey K. Barcza, Longwood, FL (US); Gary S. Yoshioka, Lakewood, CA (US)

(73) Assignee: Teledyne Defense Electronics, LLC, Rancho Cordova, CA (US)

( * ) Notice: Subject to any disclaimer, the term of this patent is extended or adjusted under 35 U.S.C. 154(b) by 108 days.

(21) Appl. No.: 17/492,474

(22) Filed: Oct. 1, 2021

(65) Prior Publication Data

US 2023/0108394 A1 Apr. 6, 2023

(51) Int. Cl.

| | |
|---|---|
| ***H01R 13/648*** | (2006.01) |
| ***H01R 24/40*** | (2011.01) |
| ***H01R 13/52*** | (2006.01) |
| ***H01R 13/53*** | (2006.01) |
| *H01R 13/533* | (2006.01) |
| *H01R 24/38* | (2011.01) |
| *H01R 13/622* | (2006.01) |

(52) U.S. Cl.

CPC ..... *H01R 13/6485* (2013.01); *H01R 13/5219* (2013.01); *H01R 13/53* (2013.01); *H01R 24/40* (2013.01); *H01R 13/52* (2013.01); *H01R 13/521* (2013.01); *H01R 13/533* (2013.01); *H01R 13/622* (2013.01); *H01R 24/38* (2013.01)

(58) Field of Classification Search

CPC ........................ H01R 13/6485; H01R 13/5219; H01R 24/40; H01R 13/52; H01R 13/521; H01R 13/622; H01R 24/38

See application file for complete search history.

(56) References Cited

U.S. PATENT DOCUMENTS 3,323,097 A * 5/1967 Tordoff .................. H01R 13/53 337/201

FOREIGN PATENT DOCUMENTS

| | | |
|---|---|---|
| JP | H 1-140572 | 2/1999 |
| JP | 2001-503564 | 3/2001 |
| JP | 2015-076163 | 4/2015 |
| JP | 2017-103854 | 6/2017 |

* cited by examiner

*Primary Examiner* — Abdullah A Riyami
*Assistant Examiner* — Justin M Kratt
(74) *Attorney, Agent, or Firm* — Haynes and Boone, LLP

(57) ABSTRACT

Various techniques are provided for displacing air from partial discharge sensitive regions of a connector of a low partial discharge high voltage connector to other regions of the low partial discharge high voltage connector where electrical flux is reduced. A plug member is mated with a receptacle member to provide the connector, with a seal member disposed in a cavity provided by the plug member and/or the receptacle member. In response to the mating, the seal member is compressed at an initial contact region between an innermost layer and an outermost layer of the seal member. In response to the compressing, air is forced radially inward toward the innermost layer and radially outward toward the outermost layer away from the initial contact region to reduce partial discharge associated with the connector. Additional methods and systems are also provided.

20 Claims, 7 Drawing Sheets

LOW PARTIAL DISCHARGE HIGH VOLTAGE CONNECTOR AND METHODS

TECHNICAL FIELD

The present invention relates generally to connectors for high voltage and low-noise applications.

BACKGROUND

Partial discharge (e.g., electrical discharge) is of particular concern in applications where ultra-low electrical noise is sought or high reliability is required. In high-end equipment, very low amounts of partial discharge may result in erratic signals. That is, with highly sensitive equipment, even small discharges that occur within an interconnect system may be enough to interfere with the signal that is being transmitted.

This partial discharge may occur where there is a voltage gradient across entrapped air. Minimizing the partial discharge along boundaries between insulating materials is a challenge because a sealing region of traditional interconnects is prone to such conditions. Further, reducing partial discharge may also prolong longevity of systems, which is highly sought after in aerospace and deep space industries where the final product may not be easily serviced.

SUMMARY

Various techniques are disclosed to provide low-noise connector solutions for high-end industrial, medical, military, and other high-reliability connector applications. For example, a low partial discharge high voltage connector reduces or removes partial discharge-causing elements for the connector design.

In one embodiment, a method includes mating a plug member with a receptacle member to provide a connector, wherein a seal member is disposed in a cavity provided by the plug member and/or the receptacle member; compressing, in response to the mating, the seal member at an initial contact region between an innermost layer and an outermost layer of the seal member; and, in response to the compressing, forcing air radially inward toward the innermost layer of the seal member and radially outward toward the outermost layer of the seal member away from the initial contact region to reduce partial discharge associated with the connector.

In another embodiment, a system includes a receptacle member; a plug member configured to mate with the receptacle member to provide a connector; and a seal member disposed in a cavity provided by the plug member and/or the receptacle member, wherein the seal member is configured to, in response to a mating of the plug member with the receptacle member, compress at an initial contact region between an innermost layer and an outermost layer of the seal member; and wherein the system is configured to, in response to a compressing of the seal member, force air radially inward toward the innermost layer of the seal member and radially outward toward the outermost layer of the seal member away from the initial contact region to reduce partial discharge associated with the connector.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
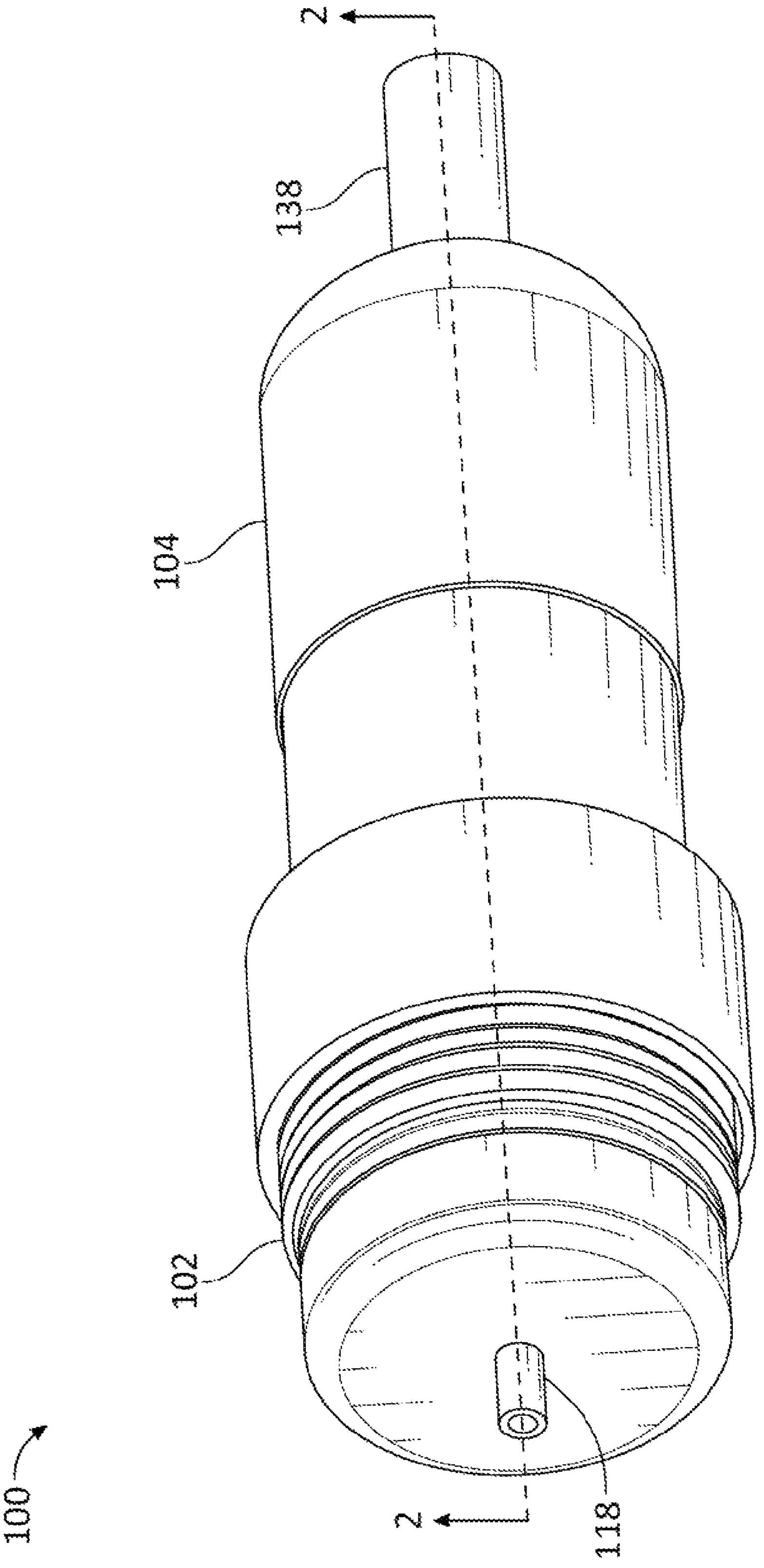
FIG. 1 illustrates an assembled view of a low partial discharge high voltage connector assembly in accordance with embodiments of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, a low partial discharge high voltage connector (e.g., also referred to as a connector assembly) is provided that includes a hybrid electrical seal design configured to displace air from partial discharge sensitive regions of the connector to other regions of the connector where electrical flux is reduced (e.g., very low or at zero value). The seal and/or mating surface is convex shaped so that an initial contact of the seal and mating surfaces occurs at an initial contact region (e.g., an area of contact between the seal and mating surfaces) situated between the seal member's innermost layer and outermost layer. As compressible material of the seal member is compressed axially, the deformation of the compressible material progresses radially inward toward the innermost layer of the seal member and radially outward toward the outermost layer of the seal member away from the initial contact region. This geometry forces the inherent air to be pushed away from the central insulation region towards the innermost and outermost semi-conductive layers.

The pushed air collects in regions within or beyond the semi-conductive sections of the seal member where the gradient of the electrical field is reduced, preventing partial discharge from occurring in the sealed and connectorized sections. Since the sealing starts between the seal's innermost layer and outermost layer as opposed to the innermost layer or the outermost layer, each sealing distance is roughly half that of a traditional sealing mechanism. This reduction in sealing distance dramatically reduces the amount of mating force required to evacuate air from high stress regions.

That is, to prevent partial discharges from occurring in regions susceptible to localized dielectric breakdown, the connector must be mated with enough force to remove air from regions with high field gradient. General high-voltage connector designs in the current market that require low partial or micro discharges tend to require relatively large sealing diameters to compensate for the high electrical flux in a sealing region between a receptacle member and a plug member. Because the sealing region increases quadratically with the connector diameter, large connector designs face the challenging problem of maintaining reasonable sealing forces without sacrificing the ability to displace air from partial discharge sensitive regions of the connector.

To significantly reduce the force required to completely displace air in the sealing region, a convex geometry is utilized. This convex geometry is applicable to connectors regardless of the seal member's material or its manufacturing method. While not exclusive to the following manufacturing methods, the seal member may be integrated as part of the connector body with an overmold design or as a standalone component to be captured mechanically and/or bonded either to become a receptacle or plug end of a connector. The annular ring where the seal member and the mating surface initially make contact is between or in the middle of the seal member's innermost layer and outermost layer. As the plug and receptacle of the connector assembly begins to engage, the seal compresses starting between the seal member's innermost layer and outermost layer, progressing radially inward toward the innermost layer of the seal member and radially outward toward the outermost layer of the seal member away from the initial contact region. This middle-out sealing design reduces the longitudinal distance required to fully mate the sealing region by a significant margin when compared to that of conical seals on similar high voltage, low discharge connector designs without sacrificing the effectiveness of the air removal mechanism. This, in turn, dramatically reduces the force required to get an equivalent compression along the sealing surface. Consequently, the effort to remove air from the sealed regions and the effectiveness of the seal's ability to squeeze air away from high electrical field sections are optimized.

While the aforementioned middle-out sealing design is independently applicable to all high voltage connector designs, its effectiveness is amplified when used in conjunction with a hybrid semi-conductor seal member. The hybrid seal design is a multi-part seal comprising of alternating semi-conductive and insulative layers. While the insulative region acts as the portion to prevent electrical breakdown, the semi-conductive layers act as a protective barrier that prevents partial discharges that occur from gaseous pockets, cracks, voids, or inclusions by removing any and all electrical flux as in accordance with Gauss's flux theorem—charge is reduced in the void that is surrounded by conductor. Furthermore, the elimination of plasma formation or ionized air reduces the seeding of the avalanching behavior of dielectric breakdown, especially when seeding location occurs at a triple junction.

The electrical circuit between the receptacle member and the plug member of the low partial discharge high voltage connector is completed by compressing the semi-conductive layer of the seal member to the mating surfaces of the plug member and the receptacle member. Once the air is displaced from the seal member's insulated surfaces and within or behind the semi-conductive layer and electrically conductive shell of the plug member and the receptacle member, the cavity provided by the plug member and/or the receptacle member, in which the seal member is disposed, will no longer produce partial discharge.

Figure 2:
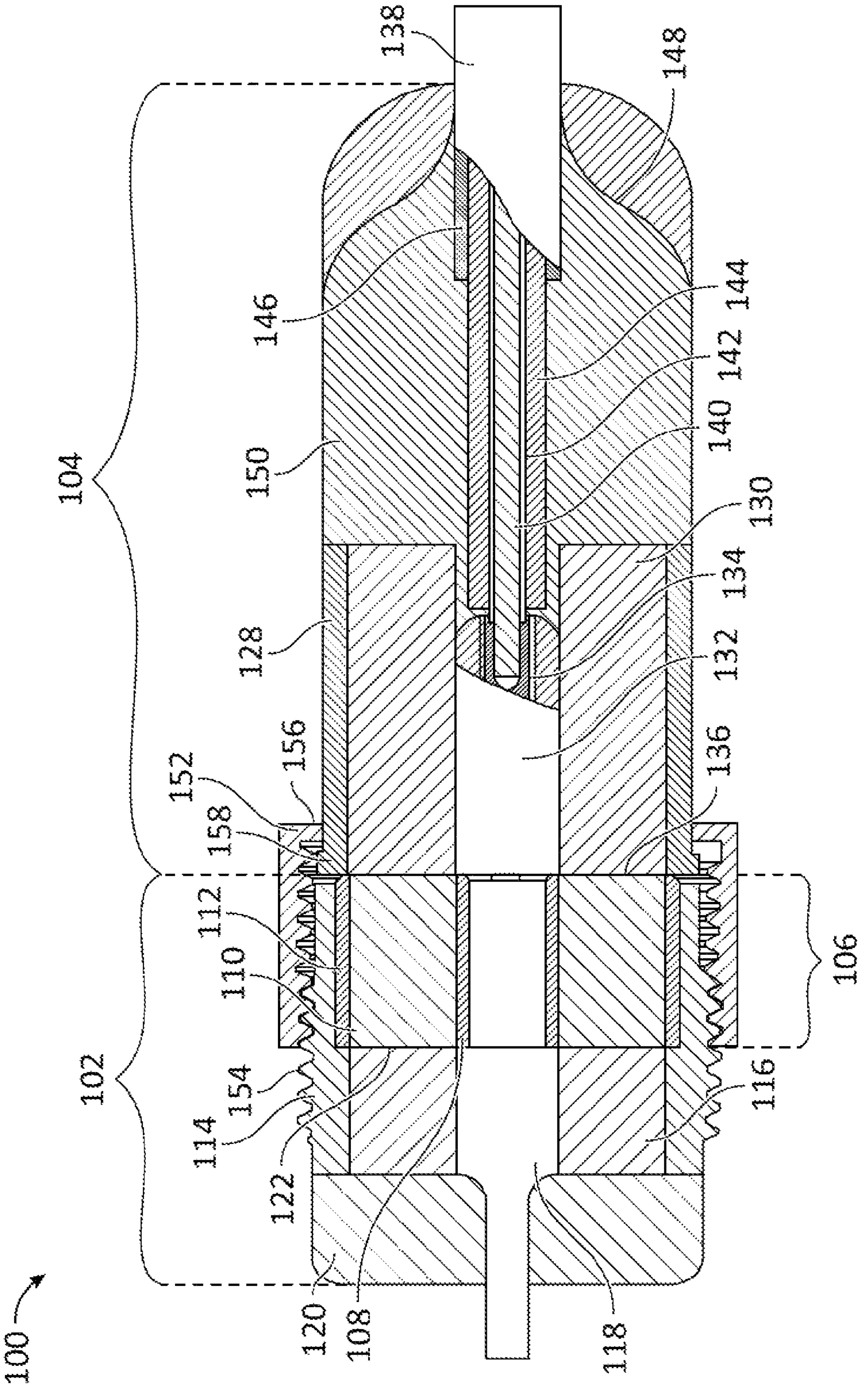
FIG. 2 illustrates a cross-sectional view of a low partial discharge high voltage connector assembly of FIG. 1, as seen along the lines of the section 2-2 taken therein, in accordance with embodiments of the disclosure.
Figure 3:
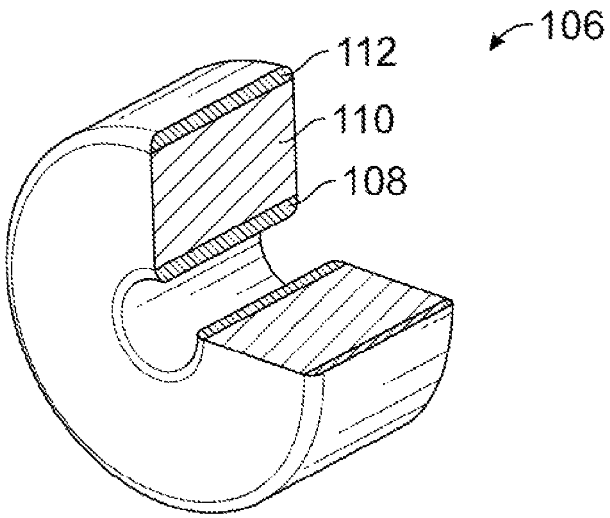
FIG. 3 illustrates an isometric view of a seal member in accordance with embodiments of the disclosure.

Turning now to the drawings, FIG. 1 illustrates an assembled view of a low partial discharge high voltage connector assembly in accordance with embodiments of the disclosure. Low partial discharge high voltage connector assembly 100 comprises receptacle member 102, plug member 104, and a seal member 106 (see FIGS. 2-3 and 6-7), with cable assembly 138 being coupled to plug member 104 and conductive member 118 of receptacle member 102 being coupled to, for example, a power distribution unit, an electrical panel, a transformer, etc. FIG. 2 illustrates a cross-sectional view of a low partial discharge high voltage connector assembly 100 of FIG. 1, as seen along the lines of the section 2-2 taken therein, in accordance with embodiments of the disclosure. Low partial discharge high voltage connector assembly 100 comprises receptacle member 102, plug member 104, and seal member 106. Seal member 106 is also illustrated separately in an isometric view of FIG. 3 with a portion removed to reveal cross-sections of an innermost layer 108, a middle layer 110, and an outermost layer 112.

Innermost layer 108 is constructed of a semi-conductive material. In some embodiments, innermost layer 108 is overmolded by middle layer 110 constructed of an insulative material and middle layer 110 is then overmolded by outermost layer 112 constructed of a semi-conductive material, all in concentric annular rings. In some embodiments, innermost layer 108, middle layer 110, and outermost layer 112 are coextruded simultaneously. Innermost layer 108, constructed of a semi-conductive material, acts as the first shielding layer to attenuate an electrical field on displaced air pockets that may be discharging had the material been made of non-conductive properties that do not maintain the same electrical potential as a conductive member of receptacle member 102 and a conductive member of plug member 104. Middle layer 110, constructed of an insulative material, prevents breakdown between innermost layer 108 and outermost layer 112. Outermost layer 112, constructed of a semi-conductive material, functions similarly to innermost layer 108 except that outmost layer maintains an electrical potential of an exterior conductive shell of receptacle member 102 and an exterior conductive shell of plug member 104. Therefore, the hybrid construction of semi-conductive (innermost layer 108), insulative (middle layer 110), semi-conductive (outermost layer 112) layers collectively provide a pliant interface to facilitate air being pushed middle-out.

This configuration allows for a uniform radial e-field distribution along the entire length of low partial discharge high voltage connector assembly 100 unlike that of traditional connector designs using a fully insulative seal. By having innermost layer 108 and outermost layer 112 constructed of semi-conductive materials, overvoltages and ionization of surrounding gases may no longer occur due to Gauss's flux theorem.

Figure 4:
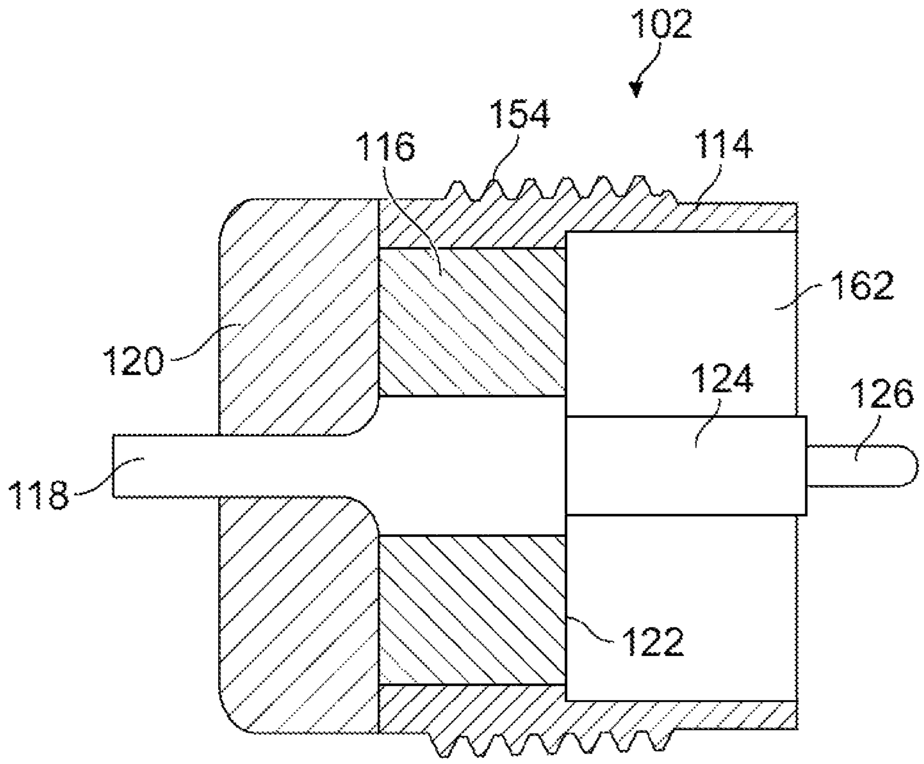
FIG. 4 illustrates a cross-sectional view of a receptacle member, as seen along the lines of section 2-2, in accordance with embodiments of the disclosure.

Receptacle member 102, which is also illustrated separately in the cross-sectional view of FIG. 4, as seen along the lines of section 2-2 shown in FIG. 1, comprises exterior conductive shell 114, insulative layer 116, conductive member 118, and insulator 120. Exterior conductive shell 114, which is formed around insulative layer 116, co-radially aligns with outermost layer 112 of seal member 106 to maintain a uniform and contiguous transition to prevent undesirable field enhancements. Insulative layer 116, which is molded around conductive member 118, aligns with middle layer 110 of seal member 106 and is complementary to middle layer 110, in that, insulative layer 116 prevents breakdown between conductive member 118 and exterior conductive shell 114. As illustrated, mating face 122 of insulative layer 116 mates with an adjacent mating face of middle layer 110 of seal member 106. That is, receptacle member 102 provides a cavity 162 bounded by exterior conductive shell 114, post 124, mating face 122 of insulative layer 116, and mating face 136 of insulative layer 130 of plug member 104. Conductive member 118 aligns with innermost layer 108 of seal member 106 such that post 124 slides through the center of seal member 106 exposing tip 126 so that tip 126 electrically couples to a conductive socket member of plug member 104 thereby maintaining a continuous electrical field. Insulator 120 is constructed from a voidless insulation material, such as silicone rubber, polyurethane, or the like, and is overmolded around the end of conductive member 118 preventing electrical breakdown out of the end of receptacle member 102. The exposed portion of conductive member 118 protruding through insulator 120 couples to, for example, a power distribution unit, an electrical panel, a transformer, etc. thereby providing continuity of electrical flow.

Figure 5:
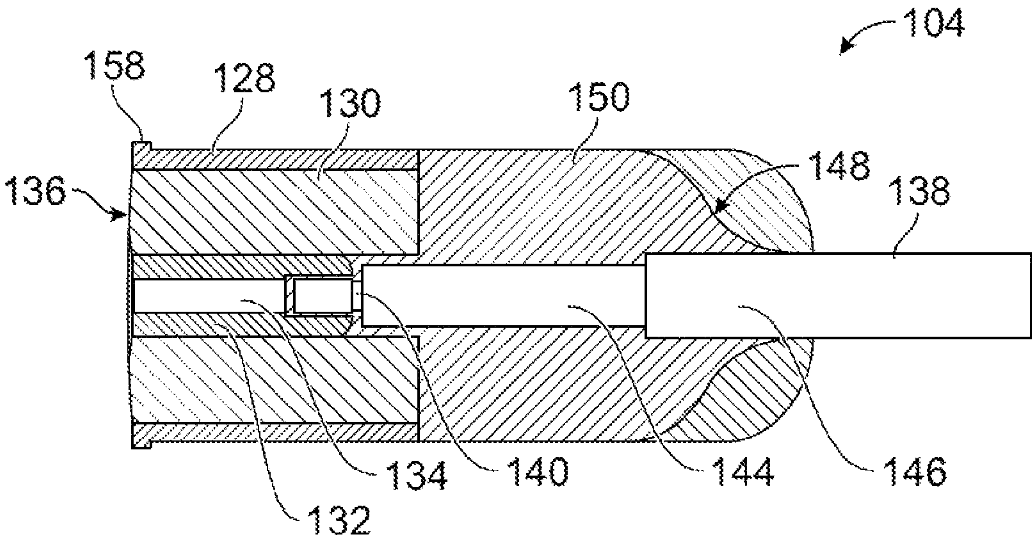
FIG. 5 illustrates a cross-sectional view of a plug member, as seen along the lines of section 2-2, in accordance with embodiments of the disclosure.

Plug member 104, which is illustrated separately in the cross-sectional view of FIG. 5, as seen along the lines of section 2-2 shown in FIG. 1, comprises exterior conductive shell 128, insulative layer 130, conductor member 132, and conductive socket pin 134. Exterior conductive shell 128, which is formed around insulative layer 130, co-radially aligns with outermost layer 112 of seal member 106 to maintain a uniform and contiguous transition to prevent undesirable field enhancements. Insulative layer 130, which is molded around conductor member 132, aligns with middle layer 110 of seal member 106 as is complementary to middle layer 110, in that, insulative layer 130 prevents breakdown between conductor member 132 and exterior conductive shell 128. As illustrated, mating face 136 of insulative layer 130 mates with an adjacent mating face of middle layer 110 of seal member 106. Conductive socket pin 134 is molded, embedded, or the like, within conductor member 132, which preserves the uniform shape of conductive socket pin 134. That is, conductor member 132 aligns with innermost layer 108 of seal member 106 to maintain a smooth electrical field. However, as tip 126 of conductive member 118 mates to conductive socket pin 134, i.e., when tip 126 slides into an open end of conductive socket pin 134 as receptacle member 102 and plug member 104 are mated, any deformity that could possibly be caused by the mating of tip 126 into conductive socket pin 134 is preserved by conductor member 132.

Plug member 104 further comprises a cable assembly 138 comprising conductor 140, inner semi-conductive layer 142, insulative layer 144, outer semi-conductive layer 146, and braided mesh shield 148. Cable assembly 138 extending to the right in the drawing may be coupled to a piece of electronic equipment. Conductor 140 is coupled to the other end of conductive socket pin 134 in a permanent manner, such as through crimping, soldering, or the like, thereby maintaining a continuous electrical field. Inner semi-conductive layer 142 is molded around conductor 140 and attenuates the electrical field of conductor 140. Insulative layer 144 is molded around inner semi-conductive layer 142 and prevents breakdown between inner semi-conductive layer 142 and outer semi-conductive layer 146. Outer semi-conductive layer 146 is molded around insulative layer 144 and maintains an electrical potential of cable assembly 138. The transitional gap between cable assembly 138 and the outer portion of plug member 104 is comprised of a voidless insulation material 150 with braided mesh shield 148 embedded in voidless insulation material 150. That is, gaps in braided mesh shield 148 allow the voidless insulation material 150 to embed within the gaps thereby bonding the braided mesh shield 148 and voidless insulation material 150. Braided mesh shield 148 further bonded to exterior conductive shell 128 to increase the outer diameter of exterior conductive shell 128 thereby maximizing a creep distance from conductor 140 prior to losing the shielding benefits of outer semi-conductive layer 146.

When receptacle member 102 and plug member 104 are mated, seal member 106 is inserted into receptacle member 102 and coupling nut 152 rotates around the threads 154 of exterior conductive shell 114 of receptacle member 102 so as to fully mate receptacle member 102 to plug member 104 Coupling nut 152 rotates on threads 154 to be fully mated up when a catch 156 of coupling nut 152 meets stop 158 of plug member 104. In accordance with the illustrative embodiments, the middle-out sealing design may be accomplished in different ways.

Figure 6:
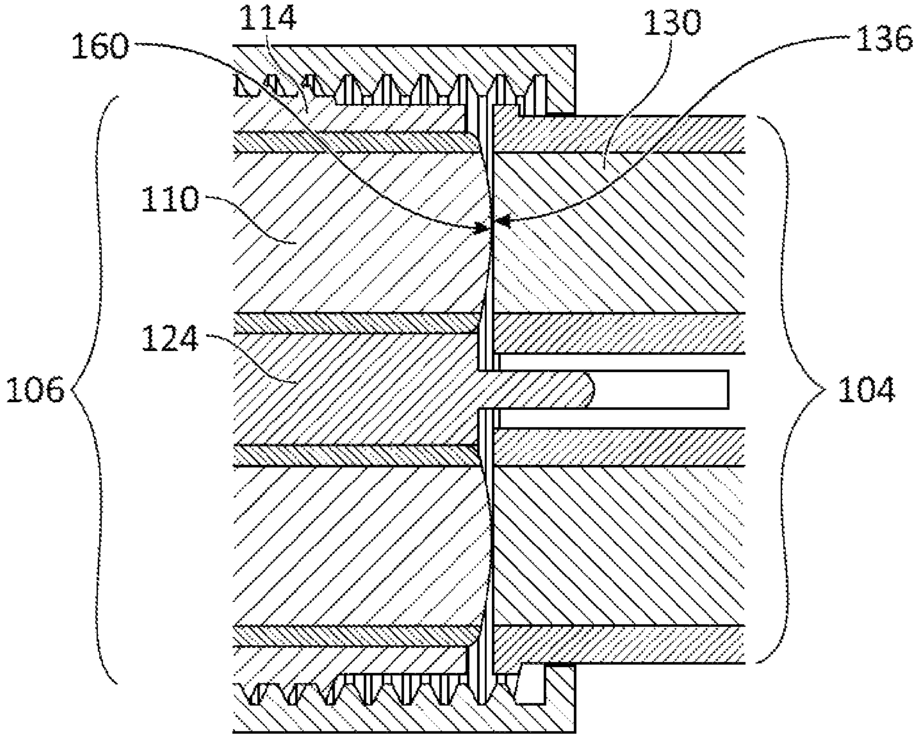
FIG. 6 illustrates a cross-sectional view of a convex shape of a mating face of a middle layer of a seal member contacting a flat surface mating face of an insulative layer of a plug member, as seen along the lines of section 2-2, in accordance with embodiments of the disclosure.
Figure 7:
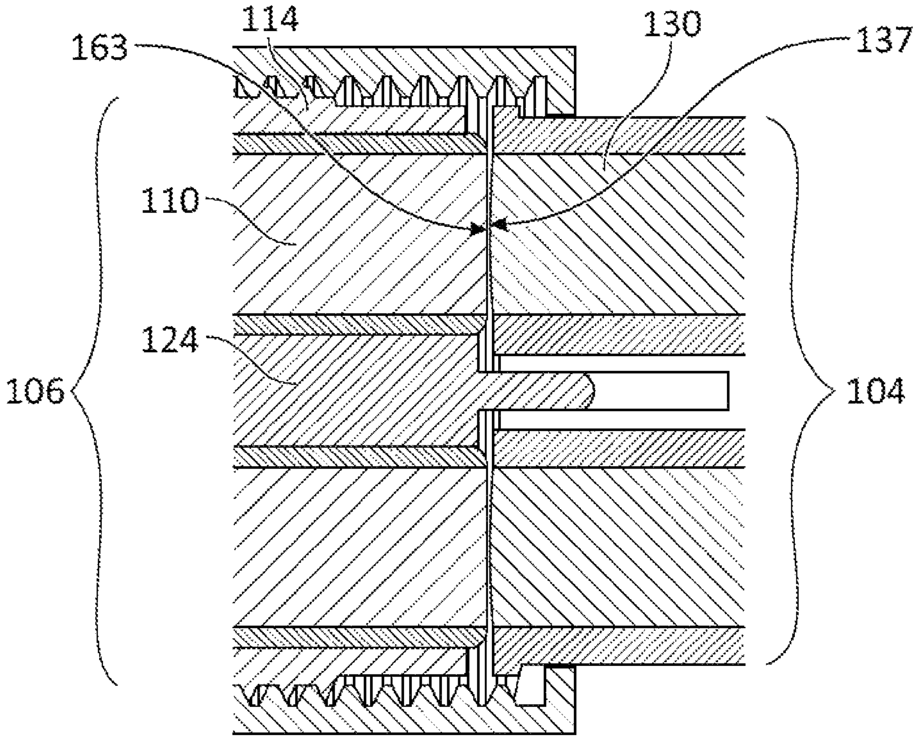
FIG. 7 illustrates a cross-sectional view of a convex shape of a mating face of an insulative layer of a plug member contacting a flat surface mating face of a middle layer of a seal member, as seen along the lines of section 2-2, in accordance with embodiments of the disclosure.

In a first embodiment, the faces of middle layer 110 of seal member 106, which mate with mating face 122 of insulative layer 116 of receptacle member 102 and mating face 136 of insulative layer 130 of plug member 104, have a convex shape. FIG. 6 illustrates a cross-sectional view of a convex shape of mating face 160 of middle layer 110 of seal member 106 contacting a flat surface mating face 136 of insulative layer 130 of plug member 104, as seen along the lines of section 2-2 shown in FIG. 1, in accordance with embodiments of the disclosure. While not illustrated in FIG. 6, a similar convex shape of middle layer 110 on an opposite side of seal member 106 contacts a flat surface mating face 122 of insulative layer 116 of receptacle member 102. Therefore, by the convex shape of the mating face 160 contacting the flat surface mating face 136 and, similarly, by the convex shape of middle layer 110 on the opposite side of the seal member 106 contacting the flat surface mating face 122, as the plug member 104 is mated to the receptacle member 102, air is forced radially inward toward the innermost layer of the seal member 106 and post 124 of receptacle member 102 and radially outward toward the outermost layer of the seal member 106 and exterior conductive shell 114 away from the partial discharge sensitive regions (e.g., regions susceptible to localized dielectric breakdown where there is a voltage gradient across entrapped air or the area between the innermost layer 108 and the outermost layer 112 of seal member 106). In a second embodiment, mating face 122 of insulative layer 116 of receptacle member 102 and mating face 136 of insulative layer 130 of plug member 104, which mate with the faces of middle layer 110 of seal member 106, have the convex shape. FIG. 7 illustrates a cross-sectional view of a convex shape of mating face 137 of insulative layer 130 of plug member 104 contacting a flat surface mating face 163 of middle layer 110 of seal member 106, as seen along the lines of section 2-2 shown in FIG. 1, in accordance with embodiments of the disclosure. While not illustrated in FIG. 7, a similar convex shape of mating face 122 of insulative layer 116 of receptacle member 102 contacts a flat surface mating face of middle layer 110 on an opposite side of seal member 106. Therefore, by the convex shape of the mating face 137 contacting the flat surface mating face 163 and, similarly, by the convex shape of mating face 122 contacting the flat surface mating face of middle layer 110 on the opposite side of the seal member 106, as the plug member 104 is mated to the receptacle member 102, air is forced radially inward toward the innermost layer of the seal member 106 and post 124 of receptacle member 102 and radially outward toward the outermost layer of the seal member 106 and exterior conductive shell 114 away from the partial discharge sensitive regions, i.e. regions susceptible to localized dielectric breakdown where there is a voltage gradient across entrapped air or the area between the innermost layer 108 and the outermost layer 112 of seal member 106.

In either embodiment, when the mating faces of seal member 106 initially mate with mating face 122 of insulative layer 116 of receptacle member 102 and mating face 136 of insulative layer 130 of plug member 104, middle layer 110 compresses radially inward toward the innermost layer 108 of the seal member 106 and radially outward toward the outermost layer 112 of the seal member 106 away from the initial contact region. This middle-out sealing design reduces the longitudinal distance required to fully mate seal member 106 by a significant margin when compared to that of conical seals on similar high voltage, low discharge connector designs without sacrificing the effectiveness of the air removal mechanism. This, in turn, dramatically reduces the force required to get an equivalent compression along the sealing surface. Consequently, the effort to remove air from the sealed regions and the effectiveness of the seal's ability to squeeze air away from high electrical field sections are optimized.

Figure 8:
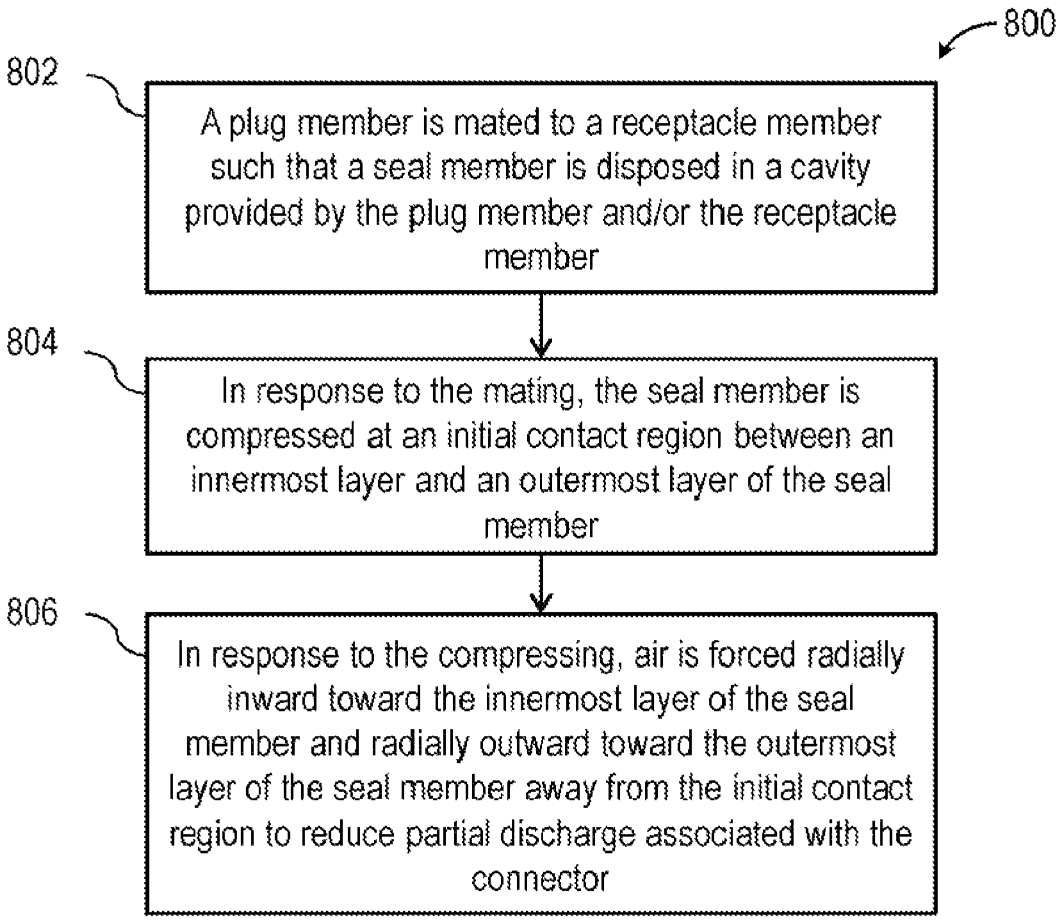
FIG. 8 illustrates a process of forming a low partial discharge high voltage connector assembly in accordance with an embodiment of the disclosure.

FIG. 8 illustrates a process 800 of forming a low partial discharge high voltage connector assembly in accordance with an embodiment of the disclosure. In block 802, plug member 104 is mated to a receptacle member 102 such that seal member 106 is disposed in a cavity provided by plug member 104 and/or receptacle member 102. In block 804, in response to the mating, seal member 106 is compressed at an initial contact region between innermost layer 108 and outermost layer 112 of seal member 106. In block 806, in response to the compressing, air is forced radially inward toward the innermost layer 108 of the seal member 106 and radially outward toward the outermost layer 112 of the seal member 106 away from the initial contact region to reduce partial discharge associated with the connector.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein. For example, in some embodiments, software controlled machines (e.g., 3D printers) may be used to manufacture seal member 106 and/or other components described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for assembling a connector, the method comprising:

mating a plug member with a receptacle member to provide the connector, wherein a seal member is disposed in a cavity provided by the plug member and/or the receptacle member;

compressing, in response to the mating, the seal member at an initial contact region between an innermost layer and an outermost layer of the seal member; and in response to the compressing, forcing air radially inward toward the innermost layer of the seal member and radially outward toward the outermost layer of the seal member away from the initial contact region to reduce partial discharge associated with the connector.

2. The method for assembling a connector of claim 1, wherein the seal member further comprises a middle layer disposed between the innermost layer and the outermost layer, wherein the seal member exhibits a hybrid construction such that the innermost layer comprises a semi-conductive material, the middle layer comprises an insulative material, and the outermost layer comprises a semi-conductive material that collectively provide a pliant interface to facilitate the air being forced radially inward toward the innermost layer and radially outward toward the outermost layer.

3. The method for assembling a connector of claim 1, wherein the seal member has a convex shape that causes the compressing to start at the initial contact region between the innermost layer and the outermost layer of the seal member.

4. The method for assembling a connector of claim 1, wherein a face of the receptacle member and a face of the plug member have a convex shape that causes the compressing to start at the initial contact region between the innermost layer and the outermost layer of the seal member.

5. The method for assembling a connector of claim 1, wherein an electrical connection is made between the receptacle member and the plug member by a conductive member of the receptacle member passing through the seal member and coupling to a first end of a conductive socket pin of the plug member.

6. The method for assembling a connector of claim 5, wherein the conductive socket pin is embedded in a conductor member of the plug member, wherein the conductor member preserves a uniform shape of the conductive socket pin, and wherein the conductor member is molded within a first insulative layer that prevents breakdown between the conductor member and an exterior conductive shell of the plug member that is formed around the first insulative layer.

7. The method for assembling a connector of claim 5, wherein a second end of the conductive socket pin is coupled to a conductor of a cable assembly, wherein the cable assembly comprises the conductor molded within an inner semi-conductive layer that attenuates an electrical field of the conductor, wherein the inner semi-conductive layer is molded within an insulative layer that prevents breakdown between the inner semi-conductive layer and an outer semi-conductive layer, wherein the insulative layer is molded within the outer semi-conductive layer, wherein the outer semi-conductive layer is wrapped by a braided mesh shield, and wherein, within the plug member, the braided mesh shield is bonded to an exterior conductive shell of the plug member and wherein the braided mesh shield is further embedded in a voidless insulation material.

8. The method for assembling a connector of claim 5, wherein the conductive member of the receptacle member is molded within a second insulative layer that prevents breakdown between the conductive member and an exterior conductive shell of the receptacle member that is formed around the second insulative layer.

9. The method for assembling a connector of claim 5, wherein a non-mating end of the receptacle member is overmolded with an insulator constructed from a voidless insulation preventing electrical breakdown out of the non-mating end of the receptacle member.

10. The method for assembling a connector of claim 1, wherein the mating of the plug member with the receptacle member is made by a coupling nut that turns around an exterior conductive shell of the plug member tightening around threads on an exterior conductive shell of the receptacle member.

11. A system for assembling a connector comprising:
- a receptacle member;
- a plug member configured to mate with the receptacle member to provide the connector;
- a seal member disposed in a cavity provided by the plug member and/or the receptacle member, wherein the seal member is configured to, in response to a mating of the plug member with the receptacle member, compress at an initial contact region between an innermost layer and an outermost layer of the seal member; and
- wherein the system is configured to, in response to a compressing of the seal member, force air radially inward toward the innermost layer of the seal member and radially outward toward the outermost layer of the seal member away from the initial contact region to reduce partial discharge associated with the connector.

12. The system for assembling a connector of claim 11, wherein the seal member further comprises a middle layer disposed between the innermost layer and the outermost layer, wherein the seal member exhibits a hybrid construction such that the innermost layer comprises a semi-conductive material, the middle layer comprises an insulative material, and the outermost layer comprises a semi-conductive material that collectively provide a pliant interface to facilitate the air being forced radially inward toward the innermost layer and radially outward toward the outermost layer.

13. The system for assembling a connector of claim 11, wherein the seal member has a convex shape that causes the compressing to start at the initial contact region between the innermost layer and the outermost layer of the seal member.

14. The system for assembling a connector of claim 11, wherein a face of the receptacle member and a face of the plug member have a convex shape that causes the compressing to start at the initial contact region between the innermost layer and the outermost layer of the seal member.

15. The system for assembling a connector of claim 11, wherein an electrical connection is made between the receptacle member and the plug member by a conductive member of the receptacle member passing through the seal member and coupling to a first end of a conductive socket pin of the plug member.

16. The system for assembling a connector of claim 15, wherein the conductive socket pin is embedded in a conductor member of the plug member, wherein the conductor member preserves a uniform shape of the conductive socket pin, and wherein the conductor member is molded within a first insulative layer that prevents breakdown between the conductor member and an exterior conductive shell of the plug member that is formed around the first insulative layer.

17. The system for assembling a connector of claim 15, wherein a second end of the conductive socket pin is coupled to a conductor of a cable assembly, wherein the cable assembly comprises the conductor molded within an inner semi-conductive layer that attenuates an electrical field of the conductor, wherein the inner semi-conductive layer is molded within an insulative layer that prevents breakdown between the inner semi-conductive layer and an outer semi-conductive layer, wherein the insulative layer is molded within the outer semi-conductive layer, wherein the outer semi-conductive layer is wrapped by a braided mesh shield, and wherein, within the plug member, the braided mesh shield is bonded to an exterior conductive shell of the plug member and wherein the braided mesh shield is further embedded in a voidless insulation material.

18. The system for assembling a connector of claim 15, wherein the conductive member of the receptacle member is molded within a second insulative layer that prevents breakdown between the conductive member and an exterior conductive shell of the receptacle member that is formed around the second insulative layer.

19. The system for assembling a connector of claim 15, wherein a non-mating end of the receptacle member is overmolded with an insulator constructed from a voidless insulation preventing electrical breakdown out of the non-mating end of the receptacle member.

20. The system for assembling a connector of claim 11, wherein the mating of the plug member with the receptacle member is made by a coupling nut that turns around an exterior conductive shell of the plug member tightening around threads on an exterior conductive shell of the receptacle member.

* * * * *